United States Patent [19]

McHenry, Jr.

[11] 4,276,150
[45] Jun. 30, 1981

[54] FLUID CATALYTIC CRACKING OF HEAVY PETROLEUM FRACTIONS

[75] Inventor: Keith W. McHenry, Jr., Glen Ellyn, Ill.

[73] Assignee: Standard Oil Company (Indiana), Chicago, Ill.

[21] Appl. No.: 91,469

[22] Filed: Nov. 5, 1979

[51] Int. Cl.³ .............................................. C10G 11/18
[52] U.S. Cl. ................................... 208/120; 208/113; 252/419; 423/415 A
[58] Field of Search ............... 208/120; 252/416–419; 423/415 A

[56] References Cited

U.S. PATENT DOCUMENTS

| 2,394,710 | 2/1946 | McAfee | 252/417 X |
| 2,414,002 | 1/1947 | Thomas et al. | 208/164 |
| 4,146,463 | 3/1979 | Radford et al. | 208/120 |

FOREIGN PATENT DOCUMENTS 2001545  2/1979  United Kingdom .................. 252/419

*Primary Examiner*—Delbert E. Gantz
*Assistant Examiner*—G. E. Schmitkons
*Attorney, Agent, or Firm*—William C. Clarke; William T. McClain; William H. Magidson

[57] ABSTRACT

A process for fluid catalytic cracking of residuum and other heavy oils comprising gas oil, petroleum residue, reduced and whole crudes and shale oil to produce gasoline and other liquid products which are separated in various streams in a fractionator and associated vapor recovery equipment wherein heat from combustion of coke on the coked catalyst is removed by reacting sulfur-containing coke deposits with steam and oxygen in a separate stripper-gasifier to produce a low BTU gas stream comprising sulfur compounds, methane, carbon monoxide, hydrogen, and carbon dioxide at a temperature of from about 1,100° F. to about 2,200° F. The partially regenerated catalyst then undergoes complete carbon removal in a regeneration vessel. The regenerated catalyst is recycled for re-use in the cracking of heavy petroleum fractions. The liquid products are gasoline, distillates, heavy fuel oil, and light hydrocarbons.

12 Claims, 2 Drawing Figures

FLUID CATALYTIC CRACKING OF HEAVY PETROLEUM FRACTIONS

BACKGROUND OF THE INVENTION

The present invention concerns a fluid catalytic process wherein (a) residuum and other heavy oils containing sulfur compounds are cracked to produce useful products, (b) sulfur-containing coke on the used catalyst is gasified using a steam-air mixture at a temperature from about 1100° F. to about 2200° F. to produce a low BTU gas and hydrogen sulfide, (c) the partially decoked catalyst is regenerated by full combustion of the remaining coke on the used catalyst wherein the flue gas contains sulfur oxides, and (d) the regenerated catalyst is returned to the heavy oil cracker for re-use.

The treatment of a reduced crude or residual oil to produce hydrocarbon products of greater economic value than petroleum coke has long been a problem in the petroleum industry. The nature of the feed, including sulfur content, and the need to improve production of liquid products including gasoline from all available petroleum sources are aspects of the problem. Catalytic cracking of the residual oil causes deposits of coke upon the catalyst so catalyst material is continuously withdrawn from the cracking unit and sent to a regenerator where the coke is burned off. High coke yields from cracking residual oils require removal of large quantities of excess energy as heat from the regenerator and reduce production of liquid products. Moreover, although catalytic cracking of residual oils can be more attractive economically than other processes for utilizing the residual oils, the required regenerator can be an extremely large economic investment because of the necessity of auxiliary means for removing the excess heat generated by the combustion of the coke in excess of the reactor requirements. An associated problem is the high sulfur content of the coke which results in the formation of environmentally unacceptable amounts of sulfur oxides during combustion.

The catalytic cracking of various heavier mineral hydrocarbons, for instance, petroleum or other mineral oil distillates such as straight run and cracked gas oils; petroleum residues, etc., has been practiced for many years. The term "gas oil" is a broad, general term that covers a variety of stocks. The term includes a light gas oil (boiling range 400° to 600° F.), heavy gas oil (boiling range 600° to 800° F.) and vacuum gas oils (boiling range 800° to 1100° F.) The petroleum residues have a boiling range from about 1100° F. and up. The vacuum gas oils and residuals together represent the atmospheric reduced crude.

A residual stock is in general any petroleum fraction with a higher boiling range than gas oils. Any fraction, regardless of its initial boiling point, which includes the heavy bottoms, such as tars, asphalts, or other undistilled materials can be termed a residual fraction. Accordingly, a residual stock can be the portion of the crude remaining undistilled at about 1050°–1200° F., or it can be made up of a vacuum gas oil fraction plus the portion undistilled at about 1050°–1200° F. For instance, a topped crude may be the entire portion of the crude remaining after the light ends (the portion boiling up to about 400° F.) have been removed by distillation. Therefore, such a fraction includes the entire gas oil fraction (400° F. to 1050°–1200° F.) and the undistilled portion of the crude petroleum boiling above 1050°–1200° F.

A great deal of effort has been applied in petroleum refining to increase recovery of catalytic cracking feedstock or "gas oils" from residual fractions of petroleum oil, but attempts to employ heavier fractions of crude oil for catalytic cracking have been limited due to the heavy coke laydowns experienced in cracking such feedstocks. Coke build-up in catalytic cracking is caused by a number of factors not necessarily independent of each other. The presence of high-boiling aromatics and other hydrocarbon coke-formers in the feed and lack of selectivity in the catalyst contribute greatly to excess coke formation. In high boiling feedstocks, both of these problems are more severe since these fractions contain higher proportions of coke formers than conventional gas-oil feedstocks. Combustion of the coke formed results, as mentioned, in generation of heat in excess of reactor requirements.

Petroleum fractions containing large amounts of coke-forming components such as the asphaltic and residual materials described above can be hydrotreated to reduce coke formation. However, high boiling fractions frequently can require such severe hydrotreating to give the hydrocarbon an improved hydrogen-to-carbon ratio to make them trouble-free cracking feeds with concurrent control of coke formation and excess heat that the expense of hydrotreating is not practical. Other economically-expensive solutions to the problem of coke-formation have been proposed in the prior art.

Sulfur is also typically present in a reduced crude or residual oil. During the cracking process, some of this sulfur is deposited in the coke which is produced by the cracking process. During the conventional regeneration process sulfur oxides are produced during oxidation of the coke to carbon dioxide.

In the residual oil cracking process, the catalyst material is typically withdrawn continuously from the cracking unit and sent to a regenerator where the coke is burned off. High coke yields from cracking residual oils requires removal of a large quantity of excess energy as heat from the regenerator. When the coke is burned in the regenerator, the sulfur content of the coke is converted to sulfur oxides which are emitted in the flue gas and this may necessitate stack gas scrubbing or some other means of control. Moreover, although catalytic cracking of residual oils can be more attractive than other processes for utilizing the residual oils, an extremely large economic investment can be required because of the necessity of auxiliary means of removing the excess heat generated by the combustion of the coke in excess of the reactor requirements. An accompanying problem is the economic investment required for regenerator stack gas scrubbing. When this coke is burned in the regenerator of a catalytic cracker, this sulfur is converted to sulfur oxides.

In the prior art relative to cracking residua, Brown, et al., U.S. Pat. No. 2,885,350, teaches cracking of a heavy hydrocarbon such as residuum in the presence of activated coke and hydrogen under pressure wherein the production of the required activated coke and hydrogen are obtained by reacting steam with coke in a separate reactor. Brown, U.S. Pat. No. 2,885,350 also teaches that surplus hydrogen in the tail gas may be used for further hydrogenation or desulfurization or other after-treatment of the product withdrawn from the process. Riblett, U.S. Pat. No. 2,606,430, teaches high-temperature carbonization and gasification of coke produced by cracking to yield synthesis gas. The temperature in the cracking zone is within the range of about 900° to 1,200° F., about 1,400° to 1,600° F. in the carbonization zone, and about 2,000° F. in the gasification zone, heat being supplied to the process by the reaction of the coke. Excess coke product is recycled. Watkins, U.S. Pat. No. 3,017,250, teaches a process for the production of hydrogen wherein iron-containing particles are reacted with steam to produce hydrogen, at a temperature of about 1,100° to 1,300° F., the iron particles thereupon being passed to a reactor to thermally crack a hydrocarbon oil at a temperature of from 900° to 1,100° F. The resulting coke-laden iron particles are regenerated at a temperature of from about 1,500° to 1,600° F., the heat for process being supplied by the hydrocarbon oil and combustion of the reducing gases therefrom. Paterson, U.S. Pat. No. 3,172,840, teaches the coking of residuum boiling above 750° F. to produce coke and a liquid distillate, the distillate being hydrocracked to light ends and gasoline, the coking zone being a delayed coker, and the coke removed from the coke drums as product. Hamner, et al., U.S. Pat. No. 3,179,584, teaches a process for increasing hydrogen production in coking of residual oils by addition of an aqueous caustic solution to the residual hydrocarbon oils. The solution and oil feed are emulsified prior to coking, heated to a temperature between 150° and 350° F., and coked or cracked between 850° and 1,250° F. at between 0 and 200 psig. Johnson, et al., U.S. Pat. No. 3,542,532, teaches a process for production of a gas rich in hydrogen from petroleum coke having a particular size range wherein the coke is gasified with steam. The product of the process is a hydrogen and carbon monoxide containing gas. A catalyst is not used. Temperatures in the transfer-line burner range from 1,800° to 2,400° F. and in the reactor wherein the coke reacts with the steam to produce hydrogen from 1,200° to 2,400° F. Kimberlin, et al., U.S. Pat. No. 3,726,791, teaches that high Conradson carbon feeds are coked to lay down extensive carbon deposit on a gasification catalyst. The coked catalyst is then steam gasified to produce hydrogen. The catalyst is a Group V-B, VII-B, or VIII metal oxide on a support of gamma alumina, bauxite, or activated clay. Lawson, U.S. Pat. No. 3,008,896, teaches the catalytic cracking of residual oils under conditions yielding only about 30 percent conversion of the residual oil to provide gas oils for later gas oil catalytic cracking wherein oil is occluded or absorbed on the catayst which is also later cracked at a higher temperature. Leaman, et al., U.S. Pat. No. 3,433,732, teaches catalytic hydrocracking and steam regeneration of the catalyst to produce hydrogen employing a catalyst containing crystalline aluminosilicate. Thomas, et al., Canadian Pat. No. 875,528 teaches a process for production of hydrogen wherein a coked catalyst is reacted with oxygen and carbon dioxide to produce carbon monoxide, the carbon monoxide thereupon being reacted with steam over a catalyst to form hydrogen and carbon dioxide.

As an economic alternative to the solutions in the prior art, this invention employs a stripper and a gasifier to control production of excess heat and heavy coke laydown by partially removing coke deposits on the spent catalyst and producing fuel gas. The partially regenerated catalyst from the gasifier with partially-removed coke deposits undergoes complete carbon removal in the regenerator.

The primary object of this invention is to control the production of excess heat in the regeneration of catalysts caused by the production of excessive amounts of coke in the catalytic cracking of residual oils by providing an integrated process for the treatment of residual oils in which the steps of catalytic cracking of the residual oil, the regeneration of the coked catalyst, and the removal of sulfur compounds are combined and adjusted to maximize production of liquid products.

Another object of this invention is to provide an improved method for removing sulfur compounds from heavier petroleum fractions such as heavy fuel oils, residuum, etc.

Another object of this invention is to provide a process for catalytic cracking of residual oil with flexibility to handle differences in feedstocks or in the required conversion to cracked products. A further object of this invention is to provide a process for catalytic cracking of residual oil wherein control of sulfur emissions is obtained. A further object of this invention is to provide a regenerated catalyst. Another object of this invention is to provide a method for regenerating a coked catalyst wherein the coke is gasified off with steam and air or oxygen. Another object is to provide a regeneration method wherein the flow of coked catalyst to the regeneration cycle is controlled and, thereby, the regenerator temperature. These and other objects will become clear from the following specification.

Accordingly, it is generally known to convert heavy petroleum hydrocarbons in the presence of a catalyst and/or hydrogen or by thermal cracking to produce coke and low BTU gases. It is also well-known to regenerate a coked catalyst with steam to produce hydrogen or with oxygen and carbon dioxide to produce carbon monoxide. However, a process with control of excess heat produced by combustion of coke and with flexibility to handle residual oils with differing characteristics has not been known in the prior art wherein a catalyst in a transfer-line reactor is used in a fluidized bed to crack reduced crude to gasoline and other valuable liquid and gaseous products and to coke, and wherein the coke deposited on the catalyst is gasified with oxygen and steam in a separate stripper with control of excess heat to produce a low BTU fuel gas comprising sulfur compounds if present, hydrogen, methane, carbon monoxide, and carbon dioxide, and the catalyst is further regenerated in a regenerator to produce a regenerated catalyst.

SUMMARY OF THE INVENTION

Petroleum residual oil is catalytically cracked in a transfer line reactor to produce gasoline and other liquid and gaseous products, the coked catalyst is reacted with oxygen and steam wherein production of excess heat is controlled to produce a low BTU fuel gas comprising carbon monoxide and hydrogen and wherein the coked catalyst is further regenerated to provide a clean catalyst for the reaction cycle.

DETAILED DESCRIPTION OF THE INVENTION

The present invention is directed to a process for the fluid catalytic cracking of petroleum residual oil wherein residuum is catalytically cracked in a transfer-line reactor to produce gasoline and other liquid products, and the sulfur-containing coke deposits react with steam and oxygen in a separate stripper-gasifier to produce low BTU gas containing sulfur compounds, carbon monoxide, hydrogen, and partially regenerated catalyst. The reaction of coke with oxygen and steam in the stripper-gasifier is balanced to produce and maintain the required temperature. Excess heat is controlled. The low BTU gas can be used as refinery fuel. The coked catalyst is further regenerated in a regenerator wherein full coke combustion to carbon dioxide can occur to provide heat for the catalyst going to the transfer-line reactor and preheat for the steam-oxygen mixture going to the stripper-gasifier.

Figure 1:
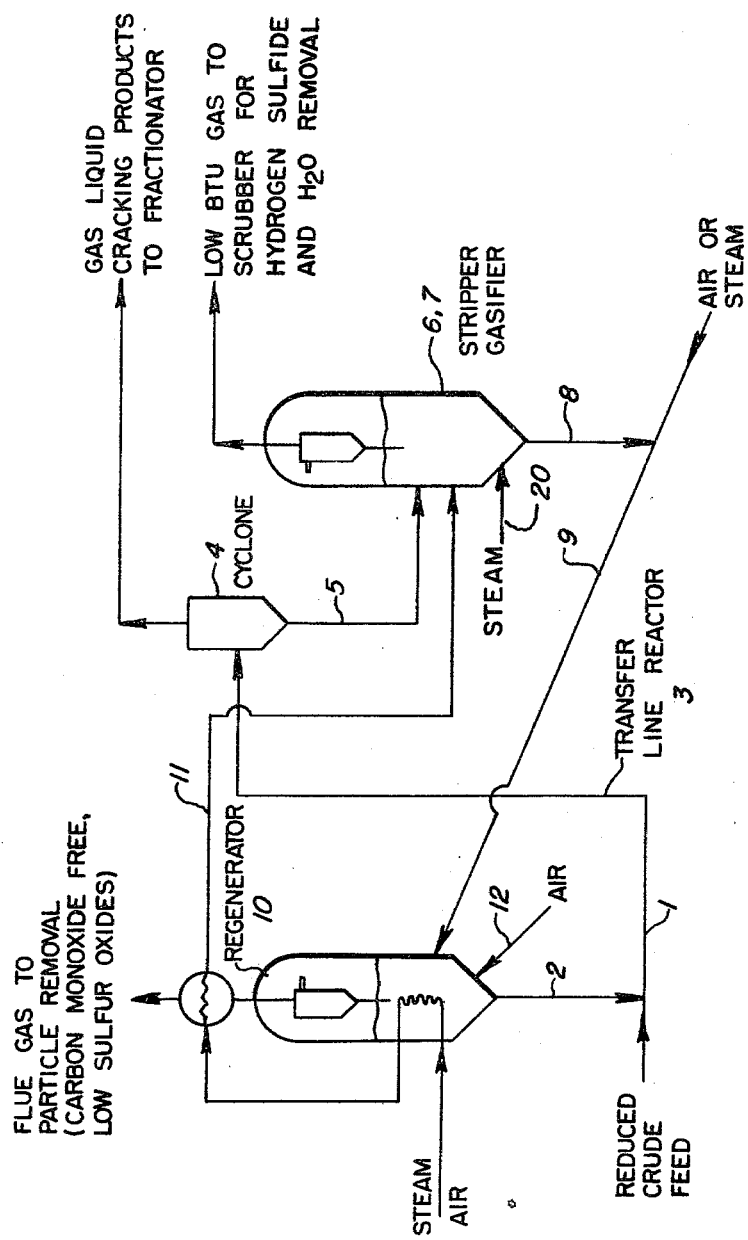

FIG. 1 is a schematic illustration of an embodiment of the invention according to which the residuum conversion is carried out wherein the regenerator, gasifier and stripper are in series.

Figure 2:
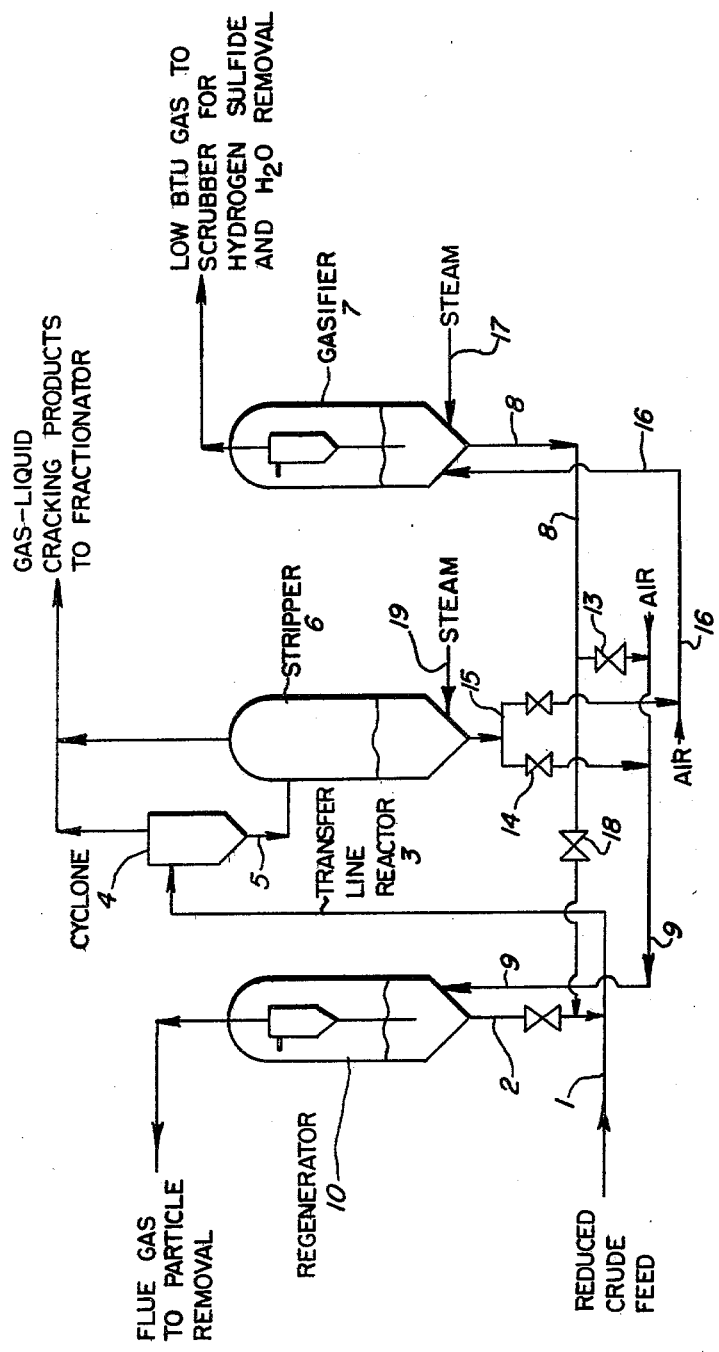

FIG. 2 is a schematic illustration of an alternative embodiment of the invention according to which the residuum conversion is carried out wherein the regenerator and gasifier are operated in parallel with each other rather than in series. Operation in parallel of the regenerator and gasifier permits the advantage of flexibility in handling feedstocks of different characteristics by allowing adjustment of the flow of catalyst from the stripper in independent streams to either the regenerator or the gasifier. Such adjustments permit control of the temperature of the catalyst returning to the transfer-line reactor and the net carbon content of decoked catalyst being returned to the transfer-line reactor.

The equipment in FIGS. 1 and 2 can be used to crack residual oils to valuable liquid and gaseous products using a catalytic transfer-line process operating at 100 psig or less, and outlet temperatures of greater than 1000° F. The coke on the catalyst is then subjected to very high temperature stripping and gasification (over 1600° F.) using a steam-air mixture which has been preheated in the regenerator. Partial oxidation and steam-carbon reactions are balanced in the stripper-gasifier to produce the required temperature. The product is low BTU gas consisting primarily of methane, carbon monoxide, and hydrogen and diluted with carbon dioxide and nitrogen. Counter-current flow of catalyst and gas is provided by suitable baffling in the stripper-gasifier to preserve methane and conserve heat. The stripped catalyst, with a portion of its coke removed, is transported to the regenerator with air or steam, depending on heat balance requirements. Full carbon monoxide combustion occurs in the regenerator providing heat for the catalyst going to the reactor and preheat for the steam-air mixture in coils in the regenerator as dictated by the heat balance. Flue gas from the regenerator will need no further treatment other than possibly particulate removal. Sulfur compounds can be virtually eliminated from the coke in the stripper-gasifier.

According to the present invention, the functions of the reactor are separated from the functions of the stripper-gasifier so that the reactor produces catalytic products and the stripper-gasifier produces only fuel gas, the heat from the regenerator is used to produce fuel gas as an important product rather than steam, and the greater portion of sulfur compounds are removed from the coke with the low BTU fuel gas rather than in the flue gas stream.

The catalytic cracking reaction is carried out in a transfer-line or riser reactor wherein the heavy petroleum residual oil is injected into a stream of hot fluidized catalyst from the catalyst regenerator. Catalyst, gas residence time and temperature within the transfer-line reactor control coke yields and production of liquid products. In general, catalyst residence time within the reactor is within the range of from about 10 sec. to about 2 min. at a temperature within the range of from about 850° F. to about 1250° F., with the outlet temperature being greater than 1000° F. and the transfer-line process operating at 100° psig or less.

The transfer-line reactor can have a length to diameter ratio of 2:1 to 20:1. Vapor velocities of 20 ft./sec. to 60 ft./sec., and gas residence times of 0.2 seconds to 3.0 seconds are suitable. Under these conditions the cracking of the residual oil is accomplished within the reactor, favoring the production of liquid products and minimizing high coke yields. A portion of the sulfur content of the feedstock sulfur compounds is retained in the coke which is deposited on the catalyst.

The hydrocarbon feed can be any stock which contains a major or at least a substantial fraction which cannot be vaporized at atmospheric pressure without extensive decomposition. Such stocks can be of virgin nature such as atmospheric residua, vacuum or hydrotreated residua, whole crudes, or they may be cycle stocks such as visbreaker tar or clarified oil obtained as bottoms upon fractionation of catalytically cracked gas oil, shale oil, and so on. In general, stocks used as feeds in the present invention will be characterized by a boiling range extending well above 1,000° F. However, typically the feed will have a boiling point within the range of from about 650° F. to 1,500° F., a gravity of about $-10°$ to 30° API, and a Conradson carbon content of about 5 to 40 weight percent.

A suitable hydrocarbon feedstock for use in the process can contain from 0.2 to 12 weight percent of sulfur in the form of organic sulfur compounds. Typically, the feedstock can contain from about 0.5 to about 5 weight percent sulfur where the sulfur is present in the form of organic sulfur compounds.

Suitable hydrocarbon cracking catalysts for use in the practice of this invention include all high-activity solid catalysts which are stable under the required conditions. Suitable catalysts include those of the amorphous silica-alumina type having an alumina content of about 10 to about 65 weight percent. Catalysts of the silica-magnesia type are also suitable which have a magnesia content of about 20 weight percent. Preferred catalysts include those of the zeolite-type which comprise from about 0.5 to about 50 weight percent and preferably from about 1 to about 30 weight percent of a crystalline aluminosilicate component distributed throughout a porous matrix. Zeolite type cracking catalysts are preferred because of their thermal stability and high catalytic activity.

The crystalline aluminosilicate or zeolite component of the zeolite-type cracking catalyst can be of any type or combination of types, natural or synthetic, which is known to be useful in catalyzing the cracking of hydrocarbons. Suitable zeolites include both naturally occurring and synthetic aluminosilicate materials such as faujasite, chabazite, mordenite, Zeolite X (U.S. Pat. No. 2,882,244), Zeolite Y (U.S. Pat. No. 3,130,007) and ultrastable large-pore zeolites (U.S. Pat. Nos. 3,293,192 and 3,449,070). The crystalline aluminosilicates having a faujasite-type crystal structure are particularly suitable and include natural faujasite, Zeolite X and Zeolite Y. These zeolites are usually prepared or occur naturally in the sodium form. The presence of this sodium can be undesirable, however, since the sodium zeolites have a low stability at high temperatures and in the presence of steam. Consequently, for use in this invention the sodium content of the zeolite is ordinarily reduced to the smallest possible value, generally less than about 1.0 weight percent and preferably below about 0.3 weight percent through ion exchange with hydrogen ions, hydrogen-precursors such as ammonium ion, or polyvalent metal cations including calcium, magnesium, strontium, barium and the rare earth metals such as cerium, lanthanum, neodymium and their mixtures. Suitable zeolites are able to maintain their pore structure under the high temperature conditions of catalyst manufacture, hydrocarbon processing and catalyst regeneration. These materials have a uniform pore structure of exceedingly small size, the cross-section diameter of the pores being in the range from about 4 to about 20 angstroms. Catalysts having a larger cross-sectional diameter of pores can also be used.

The matrix of the zeolite-type cracking catalyst is a porous refractory material within which the zeolite component is dispersed. Suitable matrix and materials can be either synthetic or naturally occurring and include, but are not limited to, silica, alumina, magnesia, boria, bauxite, titania, natural and treated clays, kieselguhr, diatomaceous earth, kaolin and mullite. Mixtures of two or more of these materials are also suitable. Particularly suitable matrix materials comprise mixtures of silica and alumina, mixtures of silica with alumina and magnesia, and also mixtures of silica and alumina in combination with natural clays and clay-like materials. Mixtures of silica and alumina are preferred, however, and contain preferably from about 10 to about 65 weight percent of alumina mixed with from about 35 to about 90 weight percent of silica, and more preferably from about 25 to about 65 weight percent of alumina mixed with from about 35 to about 75 weight percent of silica.

The steam-oxygen-containing gas mix to the regenerator can comprise steam and an oxygen-containing gas selected from the group consisting of molecular oxygen, air, and oxygen in the presence of inert diluents, which can comprise nitrogen, argon, carbon dioxide and similar inert gases.

The stripper-gasifier reaction is moderated and controlled by the amount of oxygen introduced into the stripper-gasifier. The use of air in the steam-oxygen mix results in a stripper-gasifier temperature within the range of from about 1100° F. to above 1600° F. The use of molecular oxygen in steam-oxygen-containing mix without an inert diluent can raise the stripper-gasifier temperature range to well above 1600° F. and within the range of from about 1,100° F. to 2,200° F. The use of molecular oxygen versus the use of air reduces catalyst residence time in the gasifier, removes an increased amount of coke from the coked catalyst, effectively increases the capacity of the gasifier vessel to gasify increased quantities of coked catalyst and increases the BTU content of the gas resulting from the steam-coke reaction by increasing hydrogen content of the gas to result in a gas of over 100 BTU's per cubic foot. Accordingly, the stripper-gasifier reaction rate is moderated and controlled by the oxygen-volume ratio of the steam-oxygen mix. Any suitable amount of molecular oxygen can be used in the steam-oxygen mix from about 0.1 up to approximately 3 to 4 pounds of oxygen (as molecular oxygen) per pound of coke on the coked catalyst to approximately ½ to about 18 pounds of air per pound of coke on the coked catalyst. Corresponding amounts of oxygen and inert diluents such as nitrogen and carbon dioxide when used in place of air are suitable. Excess quantities of oxygen in the form of molecular oxygen, air, and oxygen mixed with inert diluents can be used if required.

In the practice of this invention, the feedstock to the transfer-line reactor is preheated by suitable means which are not shown in FIG. 1 or 2 and then is transported by means of a pump into the bottom part of the lower section of the transfer-line reactor wherein the feed contacts the catalyst introduced from the regenerator. The catalyst has a temperature of within the range of from about 1100° to about 1600° F. The ratio of catalyst to oil on a weight basis should be in the range of about 3:1 to 30:1. Usually the oil feed contains steam for obtaining good feed dispersion. When the dispersion contacts the catalyst, a portion of the oil feed is vaporized and this plus the dispersion serves to circulate the catalyst.

Reaction products and coked catalyst from the transfer-line reactor are separated and the hydrocarbon products are passed to a fractionator not shown in FIGS. 1 and 2 for further processing. Such separation can be accomplished, for example, by the use of a disengaging vessel and one or more cyclone type gas-solid separators. The coked catalyst is passed directly into a combined stripper-gasifier as in FIG. 1 or into a stripper and then to a gasifier as in FIG. 2. The gasifier is operated within a temperature range of from about 1100° F. to about 2200° F., preferably above 1650° F., using a steam-oxygen mixture which has been preheated in the regenerator. Partial oxidation and steam-carbon reactions are balanced in the stripper-gasifier to produce the required temperature.

The gaseous product of the stripper-gasifier is a low BTU gas comprising sulfur compounds, methane, carbon dioxide, carbon monoxide, hydrogen, and nitrogen. Countercurrent flow of catalyst and gas is provided by suitable baffling in the stripper-gasifier to preserve methane and conserve heat. The partially regenerated catalyst, after stripping, is removed from the stripper-gasifier as bottoms and introduced into the regenerator vessel by means of a line which can transport either air or steam. The low BTU gas product of the stripper-gasifier is passed to a scrubber, for example, an amine absorption unit of conventional design not shown in FIGS. 1 and 2, for removal of hydrogen sulfide and traces of sulfur dioxide.

Full carbon combustion can occur in the regenerator and provide heat for the catalyst going to the transfer line reactor and preheat for the steam-oxygen mixture going to stripper-gasifier. Additional heat can be generated in the coils of the regenerator as required by the heat balance by controlling the introduction of air and steam into the regenerator. Flue gas from the regenerator is passed through a scrubber or precipitator not shown in FIGS. 1 and 2 to remove particulate matter. The regenerator is operated at a temperature within the range of from about 1100° F. to about 1500° F.

Referring to FIG. 1, the residual oil is introduced by line 1 to the process and is mixed with catalyst from line 2 prior to entering the transfer-line reactor 3. The catalyst is separated from the cracked products in cyclone 4, the overhead of cyclone 4 passing through to a fractionator (not shown). The catalyst falls from cyclone 4 and is transported by line 5 to the stripper 6-gasifier 7. Bottoms from the stripper 6-gasifier 7 comprising partially coked catalyst are transported by line 8 to line 9 wherein the coked catalyst is introduced to the regenerator 10. Flue gases from regenerator 10 are passed to a scrubber or precipitator (not shown) for particulate matter removal. Oxygen-containing gas is transported to the stripper-gasifier by line 11. Steam is introduced into the stripper-gasifier by line 20. Additional air can be introduced into the regenerator by line 12.

FIG. 2 shows parallel operation of the regenerator 10 and the separate gasifier 7 instead of series operation of the regenerator 10 and the stripper 6-gasifier 7. Catalyst from the stripper 6 is transported to the gasifier by line 15 to line 16 where the catalyst is transported by air to the gasifier 7. Steam is introduced to stripper 6 by line 19 and to gasifier 7 by line 17. The alternate method of operation in parallel as indicated permits the advantages of flexibility in handling differences in feedstocks and in required conversion to cracked products. For example, for feedstocks with Ramscarbon less than about 4 (wt.)% complete by-passing of the gasifier will be necessary because in the most likely mode of operation no excess heat is available from the process for either steam production or low BTU gas.

The operation in parallel can be with the same number of process vessels. If necessary, these same stripper and gasifier vessels can be operated in series by closing valves 18 and 14 and opening valve 13 as shown in FIG. 2. The parallel arrangement can be of particular advantage for a residual oil of low sulfur content where the control of sulfur emissions is handled by sending only a part of the spent catalyst to the gasifier. From zero to 100 volume percent of spent catalyst withdrawn from the stripper can be transported to the gasifier. The catalyst not transported to the gasifier is transported to regenerator and not subjected to the gasifying zone.

Accordingly, the invention comprises a process for the fluid catalytic cracking of hydrocarbon feedstocks containing organic sulfur compounds wherein the sulfur content of said feedstock is in the range of from about 0.1 weight percent to about 12 weight percent wherein the said feedstocks are cracked to produce useful products, sulfur oxide emissions from sulfur-containing coke deposits on the used cracking catalyst are reduced to hydrogen sulfide and emitted in a flue gas comprising a low B.T.U. gas and hydrogen sulfide, coke deposits on the used cracking catalyst are reduced in amount sufficiently by regeneration whereby the said catalyst is suitable for re-use, sulfur oxide emissions in the flue gas from the regenerator are reduced in amount, which process comprises (a) cracking said feedstock at a temperature from about 850° F. to about 1500° F. in a reaction zone in contact with fluidized solid particles, the said particles comprising a cracking catalyst; (b) withdrawing said particles from said reaction zone; (c) subjecting said particles to stripping and gasifying zones wherein steam and oxygen-containing gas are present in sufficient amount and sufficient temperature to remove sulfur compounds from said particles and coke deposits on said particles are partially oxidized by limited combustion; (d) withdrawing said particles from said stripping and gasifying zones; (e) subjecting said particles to an oxidizing zone at a sufficient temperature containing sufficient oxygen to cause flue gas emitted from said oxidizing zone to be essentially free of carbon monoxide; and (f) withdrawing the said particles from said oxidizing zone whereby the said particles are in a condition suitable for re-use in the reaction zone.

In summary, the invention comprises a fluid catalytic cracking process for converting residual oil to gasoline of high octane quality and to other valuable products which comprises cracking heavy petroleum oils wherein the feed contacts the catalyst in a transfer-line reactor, the residual oil is cracked to gas-liquid products comprising gasoline as overhead product, the gas-liquid products being separated from the bottoms comprising coked catalyst in a separator vessel, the said coked bottoms passing to stripper-gasifier zones wherein low BTU gases are removed, under conditions of controlled coke combustion, the partially de-coked catalyst is removed as bottoms and passed to a regenerator from which said regenerator the further de-coked catalyst is withdrawn in a condition suitable for re-use in the reaction zone.

The present invention is illustrated with respect to catalytic cracking of a residual oil. However, it should be understood that the improved method and means of this invention can be applied generally for other related hydrocarbon conversion processes, and that the illustration of the invention is not intended to limit the scope of the invention.

EXAMPLE I

A Gach Saran atmospheric residuum having a sulfur content of 2.50 weight percent is treated in the following manner.

A two-barrel/stream day fluid catalytic cracking unit pilot plant is used corresponding to the diagram in FIG. 1.

Residuum mixed with steam is carried through a preheater to the reactor. Feed properties are as follows:

TABLE I

| Feed Properties - Gach Saran Atmospheric Residuum | |
|---|---|
| Gravity, °API | 16.0 |
| Sulfur, Wt% | 2.50 |
| Nitrogen, Wt% | 0.42 |
| Hydrogen, Wt% | 11.45 |
| Carbon, Wt% | 85.22 |
| Ramsbottom Carbon Residue, Wt% | 10.03 |
| Pentane Insoluble, Wt% | 7.33 |
| Hot Heptane Insoluble, Wt% | 4.68 |
| Viscosity, $C_2$ 210° F. | 33.14 |
| 275° F. | 11.93 |
| Composition, Vol% | |
| 430° F. IBP | 0.8 |
| 430°-650° F. | 9.4 |
| 605°-1000° F. | 47.4 |
| 1000° F.+ | 42.9 |
| Composition, Wt% | |
| Oils | 47.2 |
| Resins | 34.3 |
| Asphaltenes | 3.5 |

Cracked products and inert materials flow along with the catalyst through the transfer line reactor to a cyclone. The gases are separated. The catalyst is stripped of residual vapors at 1000° F. and subsequently flows through a slide valve where it is picked up with steam for regeneration.

Catalyst used is a zeolite-type having the following properties:

TABLE II

| Catalyst Properties | |
|---|---|
| Activity | |
| RMA | 120.0 |
| Coke Factor | 1.15 |
| $C_3$ Factor | 0.98 |
| $C_3 =$ Factor | 1.04 |
| Particle Density, g/cc | 1.45 |
| Pore Volume, cc/g | 0.30 |
| Surface Area, m²/g | 75.0 |
| Particle Size | |
| 0-20 micron, Wt% | 3.6 |
| 20-40 micron, Wt% | 14.8 |
| 40-8 micron, Wt% | 71.6 |

TABLE II-continued

| Catalyst Properties | |
|---|---|
| 80+ micron, Wt% | 10.0 |

Coke composition and process conditions are in Table III.

TABLE III

| Coke Composition and Process Conditions (Calculated) | |
|---|---|
| Coke, lbs/hr | 100 |
| Coke, Composition, wt.% | |
| Hydrogen | 6.0 |
| Oxygen | 0.0 |
| Sulfur | 4.4 |
| Carbon | 89.6 |
| Nitrogen | 0.0 |
| Gasifier Operating Conditons | |
| Pressure, atm | 2.7 |
| Temperatures of Inlet Streams To Gasifier, °F. | |
| Coke (At top of Cyclone) | 905 |
| Catalyst | 905 |
| Steam | 300 |
| Heat Loss To Surroundings (BTU/hr) | 10,000 |

Calculated gasifier gas composition at optimum operating conditions based upon the coke composition and process conditions given in Table III are given in the following Table IV.

TABLE IV

| Gasifier Gas Composition at Optimum Operating Conditions | |
|---|---|
| lbs of Air/lb of Coke | 2 |
| lbs of Steam/lb of Coke | 0.5 |
| Gas Analysis, Mole % | |
| CO | 3.07 |
| $CO_2$ | 11.83 |
| COS | 0.006 |
| $CS_2$ | 0 |
| $S_2$ | 0 |
| $H_2O$ | 18.42 |
| $H_2S$ | 1.09 |
| $H_2$ | 17.49 |
| $N_2$ | 43.62 |
| $CH_4$ | 4.48 |
| BTU/SCF of Dry Gas | 124.8 |

The above table indicates that with selection of gasifier operating conditions, the BTU content of the produced gas can be greater than 100 BTU/SCF of gas, that most of the sulfur is converted to $H_2S$ which can be recovered in an amine scrubber.

What is claimed is:

1. A process for the fluid catalytic cracking of hydrocarbon feedstocks containing organic sulfur compounds wherein the sulfur content of said feedstock is in the range of from about 0.1 weight percent to about 12 weight percent whereby (i) the said feedstocks are cracked to produce useful products, (ii) sulfur oxide emissions from sulfur-containing coke deposits on the used cracking catalyst are reduced to hydrogen sulfide and emitted in a product gas comprising low B.T.U. gas and hydrogen sulfide, (iii) coke deposits on the used cracking catalyst are reduced in amount sufficiently by regeneration whereby the said catalyst is suitable for re-use, (iv) sulfur oxide emissions in the flue gas from the regenerator are reduced in amount, which process comprises:

(a) cracking said feedsock at a temperature from about 850° F. to about 1500° F. in a reaction zone in contact with fluidized solid particles, the said particles comprising a cracking catalyst;

(b) withdrawing said particles from said reaction zone;

(c) subjecting said particles to a stripping zone wherein steam is present in sufficient amount and sufficient temperature to strip volatile deposits from said particles;

(d) withdrawing said particles from said stripping zone;

(e) contacting said particles with steam and oxygen-containing gas in at least one gasification zone wherein temperature and amount of said steam and oxygen-containing gas are effective to partially remove sulfur-containing coke deposits from said particles through formation of a product gas comprising carbon monoxide, carbon dioxide, hydrogen and hydrogen sulfide;

(f) withdrawing said particles having a reduced coke content from said gasifying zone;

(g) subjecting said particles to an oxidizing zone at a sufficient temperature containing sufficient oxygen to cause flue gas emitted from said oxidizing zone to be essentially free of carbon monoxide; wherein temperature in said oxidizing zone is lower than temperature in said gasifying zone; and (h) withdrawing the said particles from said oxidizing zone whereby the said particles are in a condition suitable for re-use in the reaction zone.

2. The process of claim 1 wherein the said particles comprising a cracking catalyst are selected from the group consisting of an amorphous silica-alumina type having an alumina content of about 10 to about 65 weight percent, a silica-magnesia type having a magnesia content of about 20 weight percent and a zeolite-type which comprises from about 0.5 to about 50 weight percent of a crystalline aluminosilicate component distributed through a porous matrix comprising a material selected from the group consisting of silica, alumina, magnesia, boria, bauxite, titania, natural and treated clays, kieselguhr, diatomaceous earth, kaolin, mullites and mixtures thereof.

3. The process of claim 1 wherein the said stripping and gasifying zones are contained in a single vessel wherein the flow of said particles is counter-current to flow of said steam and said oxygen-containing gas and the temperature within said single vessel is in the range of from about 1100° F. to 2200° F. and the said oxidizing zone is contained in a regenerator vessel.

4. The process of claim 1 wherein the said stripping zone comprises a separate stripping vessel and the said gasifying zone comprises a separate gasifying vessel, and the temperature of each zone within each vessel is in the range of from about 1100° F. to about 2200° F. and the said oxidizing zone is contained in a regenerator vessel.

5. The process of claim 4 wherein the said stripping vessel and the said gasifying vessel are operated in series with said regenerator vessel.

6. The process of claim 4 wherein the said gasifying vessel is operated in parallel with said regenerator vessel.

7. The process of claim 4 wherein the temperature of the said stripping vessel is within the range of from about 1100° F. to 1600° F. and the temperature of the gasifying vessel is within the range of from about 1100° F. to about 2200° F.

8. The process of claim 1 wherein the coke deposits on said used catalyst are reduced in amount from a range of about 1.0 weight percent to 5.0 weight percent to a range from about 0.01 weight percent to about 0.5 weight percent.

9. The process of claim 1 wherein the said oxygen containing gas is selected from the group consisting of molecular oxygen, molecular oxygen in the presence of inert diluents and air.

10. The process of claim 1 wherein the ratio of oxygen in said oxygen-containing gas to coke deposits on said particles is within the range of about 0.1 pounds of oxygen per pound of coke to about 4 pounds of oxygen per pound of coke.

11. The process of claim 1 wherein from zero to 100 volume percent of the said particles withdrawn from said stripping zone are subjected to the gasifying zone.

12. The process of claim 1 wherein the ratio of steam to oxygen in oxygen-containing gas in said gasifying zone is about 0.5 lbs of steam per about 2 lbs of air.

* * * * *

UNITED STATES PATENT OFFICE
CERTIFICATE OF CORRECTION

Patent No. 4,276,150   Dated June 30, 1981

Inventor(s)   Keith W. McHenry, Jr.

It is certified that error appears in the above-identified patent and that said Letters Patent are hereby corrected as shown below:

Patent reads at:

| Col. | Line | | | |
|---|---|---|---|---|
| 6 | 3 | "100° psig" and should read --100 psig--. | | |
| 10 (Table I) | 38 - 39 | "Viscosity, $C_2$ 210°F<br>275°F | 33.14<br>11.93 " | and should read |
| | | --Viscosity, Cs 210°F<br>275°F | 33.14<br>11.93 -- | |
| 10 | 42 | "605° - 1000°F-- and should read --650°- 1000°F-- | | |

Signed and Sealed this

Twenty-second Day of December 1981

|SEAL|

Attest:

GERALD J. MOSSINGHOFF

Attesting Officer   Commissioner of Patents and Trademarks